United States Patent
Ganguli et al.

(10) Patent No.: US 9,909,872 B2
(45) Date of Patent: Mar. 6, 2018

(54) SYSTEMS AND METHODS FOR INERTIAL REFERENCE SYSTEM ALIGNMENT

(71) Applicant: Honeywell International Inc., Morristown, NJ (US)

(72) Inventors: Subhabrata Ganguli, Plymouth, MN (US); Michael Ray Elgersma, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 153 days.

(21) Appl. No.: 14/326,025

(22) Filed: Jul. 8, 2014

(65) Prior Publication Data
US 2016/0010992 A1 Jan. 14, 2016

(51) Int. Cl.
*G01C 19/56* (2012.01)
*G01P 15/02* (2013.01)
*G01C 25/00* (2006.01)

(52) U.S. Cl.
CPC .......... *G01C 19/56* (2013.01); *G01C 25/005* (2013.01); *G01P 15/02* (2013.01)

(58) Field of Classification Search
None
See application file for complete search history.

(56) References Cited

U.S. PATENT DOCUMENTS

| 6,498,996 | B1 | 12/2002 | Vallot |
| 7,418,364 | B1* | 8/2008 | Horton ................ G01C 21/16 702/151 |
| 7,421,343 | B2 | 9/2008 | Hawkinson |
| 2006/0224321 | A1* | 10/2006 | Lund .................. G01C 19/58 701/470 |
| 2009/0314083 | A1 | 12/2009 | Millet |
| 2011/0022349 | A1 | 1/2011 | Stirling et al. |
| 2013/0291550 | A1* | 11/2013 | Weinzierl ............ F02C 9/26 60/776 |
| 2014/0139374 | A1 | 5/2014 | Wellman et al. |

OTHER PUBLICATIONS

Skaloud et al., "Detection and Filtering of Short-Term (1/f) Noise in Inertial Sensors", "Journal of the Institute of Navigation", Summer 1999, pp. 97-107, vol. 46, No. 9.
(Continued)

*Primary Examiner* — Abby Y Lin
*Assistant Examiner* — Paula A Castro
(74) *Attorney, Agent, or Firm* — Fogg & Power LLC

(57) ABSTRACT

Systems and methods for inertial reference system alignment are provided. In certain embodiments, a system comprises an inertial reference system, the inertial reference system providing motion measurements; and a processing system coupled to receive the motion measurements from the inertial reference system. Further, the processing system is configured to execute instructions that direct the processing system to identify one or more frequencies in the spectrum of the motion measurements that are associated with vibrations; attenuate the motion measurements at the one or more frequencies; and use the attenuated measurements to aid in the production of navigation information.

18 Claims, 3 Drawing Sheets

(56) References Cited

OTHER PUBLICATIONS

European Patent Office, "Extended European Search Report from EP Application No. 15171754.3 dated Nov. 20, 2015", "from Foreign Counterpart of U.S. Appl. No. 14/326,025", Nov. 20, 2015, pp. 1-8, Published in: EP.
Bertran et al., "Adaptive Suppression of Narrow-Band Vibrations", "5th International Workshop on COIMBRA", Jun. 29-Jul. 1, 1998, pp. 288-292, Published in: Portugal.
Kim et al., "Realization of a MEMS Attitude Reference System for a Small Aerial Vehicle", "38th Annual Conference on IEEE Industrial Electronics Society", Oct. 25, 2012, pp. 1567-1570, Publisher: IEEE.

\* cited by examiner

US 9,909,872 B2

SYSTEMS AND METHODS FOR INERTIAL REFERENCE SYSTEM ALIGNMENT

BACKGROUND

Inertial reference systems are able to provide measurements that are used by a vehicle to determine the vehicle's navigation solution. For example, an inertial reference system may include multiple gyroscopes and accelerometers that provide measurements that are used by a vehicle to determine the position, attitude, velocity, and heading of the vehicle. When an inertial reference system commences operation, the inertial reference system performs alignment to find its orientation (roll, pitch and heading angles) with respect to a reference axis for the system, for example the local level frame. However, vibrations during the alignment phase of the inertial reference system may negatively affect the ability of the inertial reference system to align itself in a timely manner. For example, when the vehicle is a helicopter, during the alignment phase, the helicopter is spooling up the rotor. Rotor spool up can cause a large varying vibration that can slow the convergence of the inertial reference system to a satisfactory alignment state.

SUMMARY

Systems and methods for inertial reference system alignment are provided. In certain embodiments, a system comprises an inertial reference system, the inertial reference system providing motion measurements; and a processing system coupled to receive the motion measurements from the inertial reference system. Further, the processing system is configured to execute instructions that direct the processing system to identify one or more frequencies in the spectrum of the motion measurements that are associated with vibrations; attenuate the motion measurements at the one or more frequencies; and use the attenuated measurements to aid in the production of navigation information.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
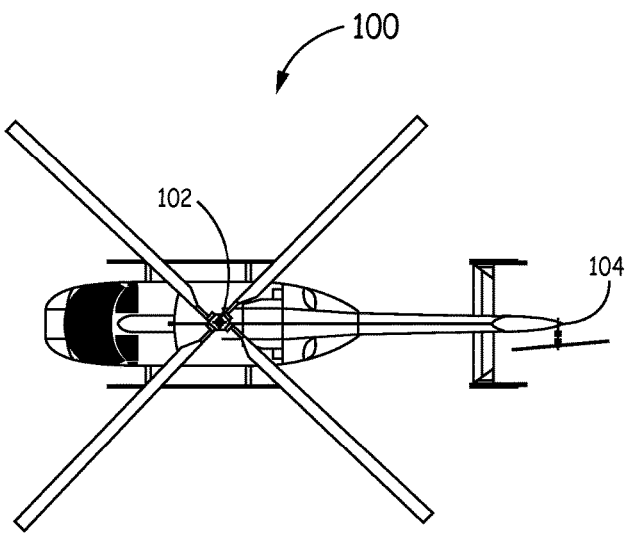
FIG. 1 is a diagram illustrating a helicopter having an inertial reference system in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments described herein are drawn to a systems and methods for aiding inertial reference system alignment when subjected to varying vibrations. For example, an inertial reference system on a helicopter may experience varying vibrations during the alignment phase due to rotor spool up. As the rotation rate of the rotors increases, the helicopter (and accompanying inertial reference system) is subjected to vibrations that change frequency in accordance with the accelerating rate of rotation. As this varying vibration changes frequency during the alignment phase of the inertial reference system, the rate of convergence for the alignment may be decreased. To alleviate the effects of the vibrations, the signal from the inertial reference system is filtered to remove the vibrations from the measurements provided by the inertial reference system. In particular, systems and methods track the varying frequencies of the vibrations and adaptively filter the vibrations from the measurements based on the varying frequencies.

FIG. 1 is an illustration of a helicopter 100. Helicopter 100 uses an inertial reference system as a navigational aid during operation. In certain embodiments, the inertial reference system includes accelerometers and gyroscopes that measure acceleration along different orthogonal axes and rotation about orthogonal axes. For example, the inertial reference system may include three gyroscopes that measure rotation about three orthogonal axes and three accelerometers that measure acceleration along three orthogonal axes. Through methods like dead reckoning and Kalman filtering, a processor may use the measurements from the inertial reference system to determine a navigation solution. The navigation solution, as determined by the processor provides information about the position, attitude, and velocity of the helicopter 100.

In certain implementations, the inertial reference system is aligned during startup. When the inertial reference system is aligned, the orientation of the axes of the inertial reference system is determined with respect to the reference axis for the system, for example, the local level frame. Also, the alignment process defines the velocity and position of the helicopter 100. However, at times on helicopter 100, the alignment process for the inertial reference system may be performed during the spool up of rotors 102 and 104. The spool up of rotors 102 and 104 occurs as the rotors begin rotating the helicopter blades and increase the rate of rotation until the blades are rotating at the desired rotational rate for flight. During the spool up, the increasing rotational rate of the helicopter blades causes vibrations at frequencies that sweep from 0 hz, when the blades are at rest, to a final operational vibration frequency, when the rotors have completed spool up such that the helicopter is ready for takeoff. Further, the rotation of the rotors also introduces vibrations at harmonics of the principal vibration frequencies. These vibrations can cause significant shaking, particularly when the rotors introduce vibrations at resonant frequencies of components of the helicopter. The shaking of the helicopter may also affect the ability of the inertial reference system to correctly align during the alignment phase.

Figure 2:
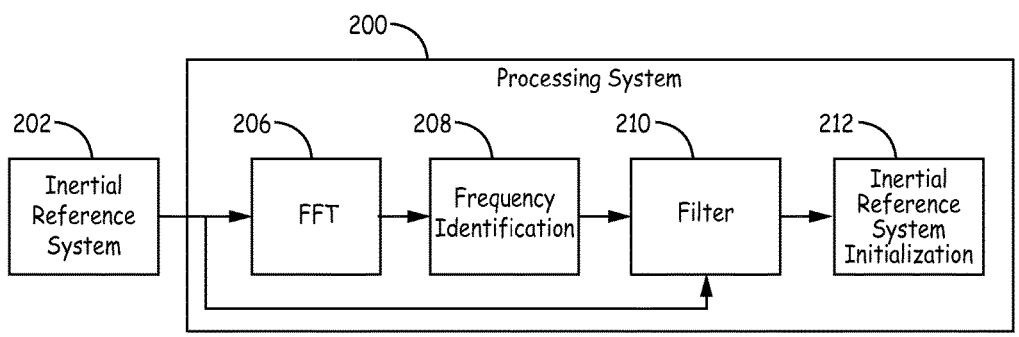
FIG. 2 is a block diagram of a system for reducing the effects of vibrations on measurements produced by an inertial reference system in one embodiment described in the present disclosure.

FIG. 2 is a block diagram of a processing system 200 for removing measurements of the vibrations caused by the spooling up of the rotors from the data provided by the inertial reference system. As illustrated, the processing system 200 receives measurements from an inertial reference system 202. The inertial reference system 202 functions substantially as described above. For example, the inertial reference system 202 provides measurements of angular rotation about three orthogonal axes and measurements of acceleration along three orthogonal axes. During normal operation, the processing system 200 receives and processes the measurements to calculate a navigation solution for the helicopter. Further, during an alignment phase for the inertial reference system 202, the processing system 200 uses the measurements from the inertial reference system 202 to orient the axes of the inertial reference system 202 with respect to the reference axis for the helicopter. To perform the alignment, the processing system 200 includes inertial reference system initialization 212. The inertial reference system initialization 212 receives the measurements from the inertial reference system 202 and orients the navigation system of the helicopter in relation to a reference axis.

In certain embodiments, as described above, the vibrations of a vehicle during the alignment phase may negatively affect the ability of the processing system 200 to align the measurements from the inertial reference system 202. These vibration amplitudes may be particularly large when the vehicle is a helicopter and their frequencies may vary if the rotor speed is changing. In one particular example, the accelerating rotation of the rotors may cause vibrations that are represented in the measurements provided by the inertial reference system 202. As explained above, these vibrations may sweep from 0 hz to a final vibration frequency associated with the final rotation speed of the rotor before takeoff. Further, the rotation of the rotors also cause harmonic vibrations at frequency multiples of a main vibration frequency that may also affect the measurements from the inertial reference system 202.

In at least one implementation, the processing system 200 removes data associated with the vibrations from the measurements received from the inertial reference system 202 before using the measurements for the alignment process. To remove the data associated with the vibrations from the measurements produced by the inertial reference system 202, the processing system performs at least one Fast Fourier Transform (FFT) 206 on the provided inertial reference system measurements. As one having skill in the art is aware, an FFT transforms data from the time domain to the frequency domain and describes a class of different algorithms. Other possible transforms that transform the measurements produced by the inertial reference system 202 from the time domain to a transform domain are also contemplated. For example, instead of performing a Fast Fourier transform, the processing system 200 may perform the more generic Discrete Fourier Transform, or other signal processing techniques known to those having skill in the art.

In certain embodiments, when the measurements from the inertial reference system have been transformed from the time domain to the frequency or transform domain, the processing system 200 includes a frequency identification 208 to identify the frequencies of the signal that are associated with the vibrations caused by the rotor spool up. For example, certain helicopters may have between one and four rotors. Each rotor, as it spools up, causes vibrations at a particular frequency and accompanying harmonic frequencies. These vibrations may be reflected in the measurements provided by the inertial reference system 202 as signals at particular frequencies at any given moment in time. The frequency identification 208 identifies the different frequencies at which the vibrations affect the inertial reference system measurements.

In at least one implementation, when the alignment phase is performed during the rotor spool up, the helicopter is stationary as the rotors accelerate. In one particular implementation, frequency identification 208 identifies frequency components of the signal that have a power or amplitude above a predetermined threshold. In an alternative implementation, the frequency identification 208 identifies a set number of frequency components that contribute to the measurements that are provided by the inertial reference system 202. For example, the frequency identification 208 may only identify a particular number of harmonics associated with a fundamental frequency. For example, frequency identification 208 may identify two fundamental frequencies, one frequency associated with the main rotor and the other frequency associated with a rear rotor of a helicopter. In at least one embodiment, to identify the two fundamental frequencies, frequency identification 208 identifies the lowest frequencies that are not multiples of one another. For instance, at a particular moment in time, the main rotor may be creating a fundamental frequency at 3 Hz and the rear rotor may be producing a rotation at 11 Hz. Thus the main rotor may be producing vibrations at 3, 6, 9, 12, . . . Hz, while the rear rotor is producing vibrations at 11, 22, 33, . . . Hz. As 3 Hz and 11 Hz are the lowest frequencies that are not multiples of one another, frequency identification 208 determines that 3 Hz and 11 Hz are the fundamental frequencies. Having identified the fundamental frequencies, frequency identification 208 is able to identify the harmonic frequencies that are located at frequency multiples of the harmonic frequency.

In certain implementations, once frequency identification 208 identifies the different frequencies associated with the vibrations caused by the rotor, the processing system 200 executes a filter 210 that filters the measurements from the inertial reference system 202 that were analyzed by frequency identification 208. For example, the processing system 200 receives a set of measurements from the inertial reference system 202 and executes the FFT 206 and frequency identification 208 to identify the vibration frequencies for the set of measurements. When the vibration frequencies are identified for the set of measurements, the filter 210 filters the set of measurements at the identified vibration frequencies to remove the effects of the vibration frequencies on the measurements from the inertial reference system 202. In at least one particular example, the filter 210 applies a notch filter at each of the frequencies identified by frequency identification 208. By removing the frequencies identified by frequency identification 208, the processing system 200 is able to provide inertial measurements to inertial reference system initialization 212 having reduced vibration effects from the rotor spool up.

Figure 3A:
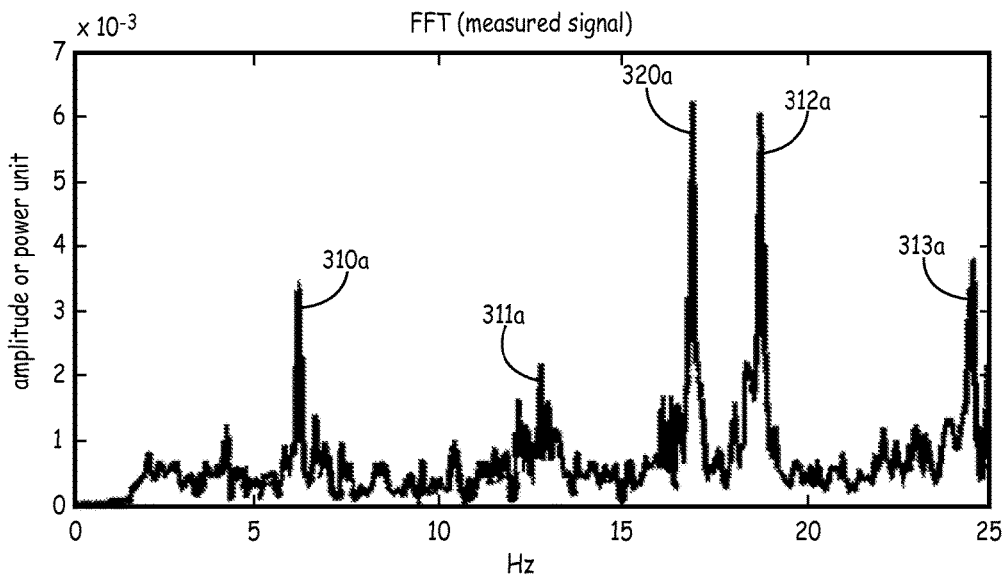
FIGS. 3A and 3B are respective spectral plots of measurements from an inertial reference system before and after filtering in one embodiment described in the present disclosure.
Figure 3B:
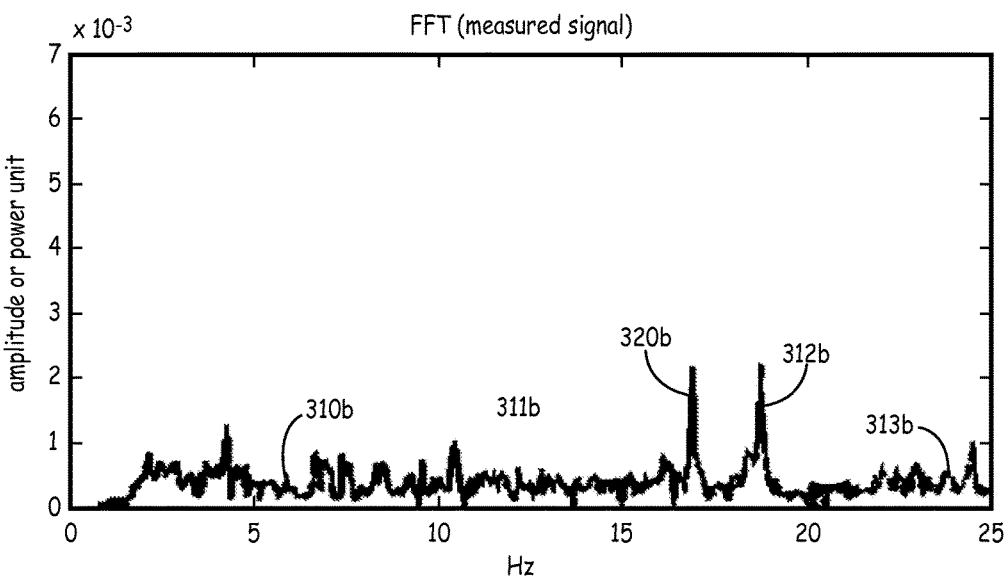

FIGS. 3A and 3B depict graphs 300a and 300b of respective inertial measurements before and after the inertial measurements are filtered. For example, graph 300a is a frequency domain graph of the inertial measurements produced by the inertial reference system before the inertial measurements are filtered to reduce the effects of vibration. In one particular implementation, graph 300a represents the data received by frequency identification 208 from FFT 206 as described above in relation to FIG. 2. As shown in FIG. 3A, the spectral data includes 5 significant peaks. These peaks are separated into two different groups based on fundamental frequency. For example, frequency identification 208 determines that peak 310a and 320a represent fundamental frequencies as they are found at the lowest frequencies that are not multiples of one another. For example, peak 310a, for the data represented in this graph, is found at about 6 hertz while peak 320a is found at about 17 hertz. In contrast the other three peaks are found at expected harmonic frequencies associated with the frequency of peak 310a. For example peak 311a is found at about 12 hertz, peak 312a is found at about 18 hertz, and peak 313a is found at about 24 hertz. As one having skill in the art would recognize, peak 310a is at the fundamental frequency f, peak 311a is at the first harmonic 2f, peak 312a is at the second harmonic 3f and peak 313a is at the third harmonic 4f. Further, peak 320a represents a fundamental frequency associated with a different source of rotation. For example, the fundamental frequency associated with peaks 310a and 320a may respectively be caused by a front rotor and a rear rotor of a helicopter. As described above, frequency identification 208 determines the frequency of the different peaks so that the filter 210 can set the frequencies of the various notch filters used to remove the vibration data.

Graph 300b in FIG. 3B, as shown, illustrates a frequency spectrum of the measurements that produced graph 300a in FIG. 3A after the measurements are filtered at the filter 210. For example, a filter 210 may use the identified frequencies from frequency identification 208. As described above in relation to graph 300a, the identified frequencies are at about 6, 12, 17, 18, and 24 hertz. Accordingly, the filter 210 applies a notch filter at each of the identified frequencies, As such the signals at the identified frequencies are significantly attenuated. For example, peaks 310b, 311b, 312b, 313b, and 320b represent the identified peaks after filtering. As shown the peaks in graph 300b have a significantly attenuated amplitude when compared to the pre-filtered signal. As such, the signal associated with graph 300b may be provided to the inertial reference system initialization 212, where the processing system may perform the alignment for the inertial reference system with reduced effects of vibration. In certain implementations, the filters 210 may also operate during normal operation to reduce the effects of vibration at the spooled up frequency on the inertial reference system 202.

Figure 4:
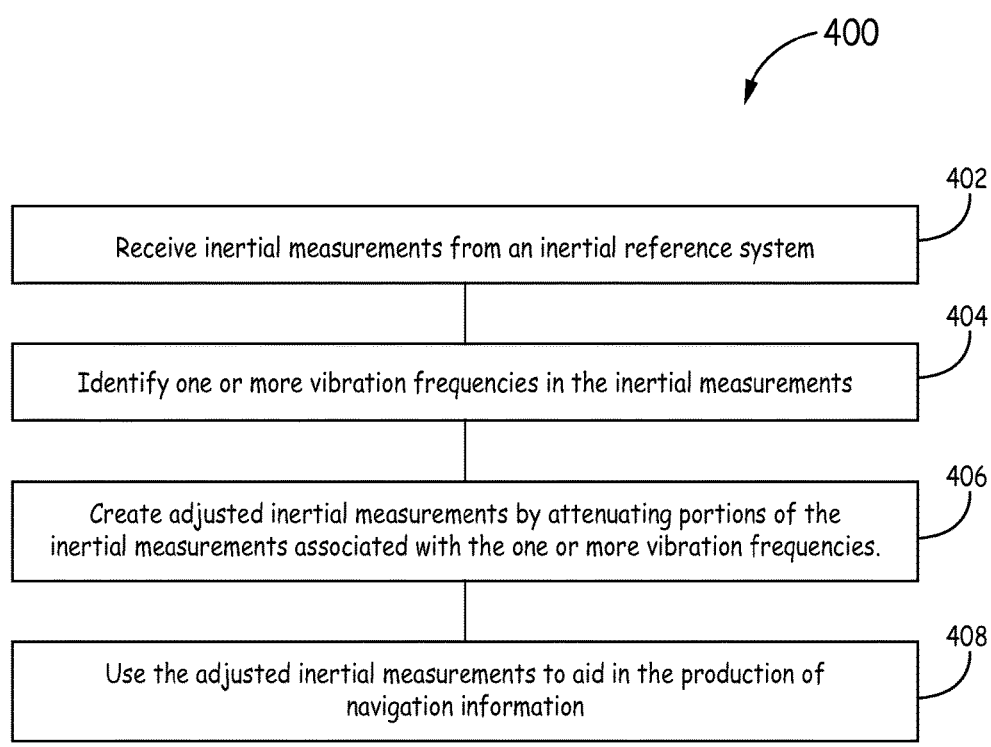
FIG. 4 is a flow diagram of a method for reducing the effects of vibrations on measurements produced by an inertial reference system in one embodiment described in the present disclosure.

FIG. 4 is a flow diagram of a method 400 for reducing the effects of vibrations on measurements produced by an inertial reference system. Method 400 proceeds at 402 where inertial measurements are received from an inertial reference system. For example, an inertial reference system provides inertial measurements to a processing system as measured by a series of gyroscopes and/or accelerometers. Method 400 then proceeds at 404 where one or more vibration frequencies are identified in the inertial measurements. For instance, the processing system may perform a transform, like an FFT, to the inertial measurements received from the inertial reference system. When the inertial measurements are transformed into the frequency or transform domain, the processing system may then proceed to identify the one or more vibration frequencies based on the signal power at a particular frequency.

In further embodiments, method 400 proceeds at 406 where adjusted inertial measurements are created by attenuating portions of the inertial measurements associated with the one or more vibration frequencies. For example, the processing system may then apply a series of notch filters at the different vibration frequencies to attenuate the effects of vibrations on the measurements produced by the inertial reference system. Method 400 proceeds at 408 where the adjusted inertial measurements are used to aid in the production of navigation information. In at least one exemplary implementation, the filtered measurements are used by the processing system to align the inertial reference system with one or more orientation axes.

EXAMPLE EMBODIMENTS

Example 1 includes a system, the system comprising: an inertial reference system, the inertial reference system providing motion measurements; and a processing system coupled to receive the motion measurements from the inertial reference system, the processing system configured to execute instructions that direct the processing system to: identify one or more frequencies in the spectrum of the motion measurements that are associated with vibrations; attenuate the motion measurements at the one or more frequencies; and use the attenuated measurements to aid in the production of navigation information.

Example 2 includes the system of Example 1, wherein the motion measurements measure the motion of a helicopter.

Example 3 includes the system of Example 2, wherein the processing system identifies the one or more frequencies and the attenuation of the motion measurements when the helicopter is performing rotor spool up.

Example 4 includes the system of any of Examples 1-3, when identifying the one or more frequencies, instructions further direct the processing system to: transform a portion of the motion measurements into the transform domain; and identify frequencies in the transform domain associated with external vibrations.

Example 5 includes the system of Example 4, wherein a frequency is identified when the power or amplitude of the signal at a particular frequency exceeds a threshold power in the transform domain.

Example 6 includes the system of any of Examples 4-5, wherein fundamental frequencies are identified and harmonic frequencies are identified based on the identified fundamental frequency.

Example 7 includes the system of any of Examples 1-6, wherein the motion measurements are attenuated through one or more notch filters, the one or more notch filters filtering at the identified one or more frequencies.

Example 8 includes the system of Example 7, wherein the notch filters adaptively adjust to the identified one or more frequencies as the one or more frequencies change.

Example 9 includes the system of any of Examples 1-8, wherein using the attenuated measurements aid in the production of navigation information comprises using the attenuated measurements to perform an initial alignment of the system in reference to one or more reference axes.

Example 10 includes a method for adjusting measurements from an inertial reference system, the method comprising: receiving inertial measurements from an inertial reference system; identifying one or more vibration frequencies in the inertial measurements; creating adjusted inertial measurements by attenuating portions of the inertial measurements associated with the one or more vibration frequencies; and using the adjusted inertial measurements to aid in the production of navigation information.

Example 11 includes the method of Example 10, wherein the inertial measurements measure the motion of a helicopter.

Example 12 includes the method of Example 11, wherein the processing system limits the performance of identifying the one or more vibration frequencies and the creation of adjusted inertial measurements to a period of time when the helicopter is performing rotor spool up.

Example 13 includes the method of any of Examples 10-12, wherein identifying the one or more vibration frequencies comprises: transforming a sample of the inertial measurements into the transform domain; and identifying the one or more vibration frequencies in the transform domain associated with external vibrations.

Example 14 includes the method of Example 13, wherein a vibration frequency in the one or more vibration frequencies is identified when the power or amplitude of the signal at a particular frequency exceeds a threshold power in the transform domain.

Example 15 includes the method of any of Examples 13-14, wherein identifying the one or more vibration frequencies comprises identifying one or more fundamental frequencies; and identifying harmonic frequencies based on the identified fundamental frequency.

Example 16 includes the method of any of Examples 10-15, wherein creating adjusted inertial measurements comprises: filtering the one or more vibration frequencies with a one or more notch filters, wherein each notch filter in the one or more notch filters is associated with a different vibration frequency in the one or more vibration frequencies.

Example 17 includes the method of Example 16, wherein the one or more notch filters adaptively adjust to the identified one or more vibration frequencies as the one or more vibration frequencies change over time.

Example 18 includes the method of any of Examples 10-17, wherein using the attenuated measurements aid in the production of navigation information comprises using the attenuated measurements to perform an initial alignment of the system in reference to one or more reference axes.

Example 19 includes a system, the system comprising: a helicopter, the helicopter comprising one or more rotors, wherein upon starting the helicopter, the one or more rotors spool up, wherein the one or more rotors accelerate rotation toward an operational frequency during rotor spool up; an inertial reference system on the helicopter, wherein the inertial reference system provides inertial measurements of the motion of the helicopter; a processing system coupled to receive the inertial measurements from the inertial reference system, the processing system configured to execute instructions that direct the processing system to: identify one or more vibration frequencies in the spectrum of the inertial measurements, wherein the one or more vibration frequencies are associated with vibrations caused by the rotor spool up; attenuate the inertial measurements at the one or more vibration frequencies; and use the attenuated inertial measurements to align a navigation solution to an at least one reference axis.

Example 20 includes the system of Example 19, when identifying the one or more vibration frequencies, instructions further direct the processing system to: transform a portion of the inertial measurements into the transform domain; and identify frequencies in the transform domain associated with the vibrations caused by the rotor spool up.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system, the system comprising: an inertial reference system, the inertial reference system providing motion measurements, wherein the motion measurements measure the motion of a helicopter; and
a processing system configured to receive the motion measurements from the inertial reference system, the processing system further configured to execute instructions that direct the processing system to:
identify one or more frequencies in the spectrum of the motion measurements that are associated with vibrations by at least one of:
identifying frequency components of a signal that have at least one of a power and amplitude above a predetermined threshold; and
identifying a set number of frequency components that contribute to the measurements provided by the inertial reference system;
attenuate the motion measurements at the one or more frequencies; and
use the attenuated measurements to aid in the production of navigation information and, establish an orientation with respect to a reference axis for a local level frame of the inertial reference system.

2. The system of claim 1, wherein the processing system identifies the one or more frequencies and the attenuation of the motion measurements when the helicopter is performing rotor spool up.

3. The system of claim 1, when identifying the one or more frequencies, instructions further direct the processing system to:
transform a portion of the motion measurements into the transform domain; and
identify frequencies in the transform domain associated with external vibrations.

4. The system of claim 3, wherein a frequency is identified when the power or amplitude of the signal at a particular frequency exceeds a threshold power in the transform domain.

5. The system of claim 3, wherein fundamental frequencies are identified and harmonic frequencies are identified based on the identified fundamental frequency.

6. The system of claim 1, wherein the motion measurements are attenuated through one or more notch filters, the one or more notch filters filtering at the identified one or more frequencies.

7. The system of claim 6, wherein the notch filters adaptively adjust to the identified one or more frequencies as the one or more frequencies change.

8. The system of claim 1, wherein using the attenuated measurements aid in the production of navigation information comprises using the attenuated measurements to perform an initial alignment of the system in reference to one or more reference axes.

9. A method for adjusting measurements from an inertial reference system, the method comprising:
receiving inertial measurements from an inertial reference system, wherein the inertial measurements measure the motion of a helicopter;
identifying one or more vibration frequencies in the inertial measurements by at least one of:
identifying frequency components of a signal that have at least one of a power and amplitude above a predetermined threshold; and
identifying a set number of frequency components that contribute to the measurements provided by the inertial reference system;
creating adjusted inertial measurements by attenuating portions of the inertial measurements associated with the one or more vibration frequencies; and
using the adjusted inertial measurements to aid in the production of navigation information and, with respect to a reference axis for a local level frame of the inertial reference system.

10. The method of claim 9, wherein the processing system limits the performance of identifying the one or more vibration frequencies and the creation of adjusted inertial measurements to a period of time when the helicopter is performing rotor spool up.

11. The method of claim 9, wherein identifying the one or more vibration frequencies comprises:
transforming a sample of the inertial measurements into the transform domain; and
identifying the one or more vibration frequencies in the transform domain associated with external vibrations.

12. The method of claim 11, wherein a vibration frequency in the one or more vibration frequencies is identified when the power or amplitude of the signal at a particular frequency exceeds a threshold power in the transform domain.

13. The method of claim 11, wherein identifying the one or more vibration frequencies comprises:
identifying one or more fundamental frequencies; and
identifying harmonic frequencies based on the identified fundamental frequency.

14. The method of claim 9, wherein creating adjusted inertial measurements comprises:
filtering the one or more vibration frequencies with a one or more notch filters, wherein each notch filter in the one or more notch filters is associated with a different vibration frequency in the one or more vibration frequencies.

15. The method of claim 14, wherein the one or more notch filters adaptively adjust to the identified one or more vibration frequencies as the one or more vibration frequencies change over time.

16. The method of claim 9, wherein using the attenuated measurements aid in the production of navigation information comprises using the attenuated measurements to perform an initial alignment of the system in reference to one or more reference axes.

17. A system, the system comprising:
a helicopter, the helicopter comprising one or more rotors, wherein upon starting the helicopter, the one or more rotors spool up, wherein the one or more rotors accelerate rotation toward an operational frequency during rotor spool up;
an inertial reference system on the helicopter, wherein the inertial reference system provides inertial measurements of the motion of the helicopter;
a processing system configure to receive the inertial measurements from the inertial reference system, the processing system further configured to execute instructions that direct the processing system to:
identify one or more vibration frequencies in the spectrum of the inertial measurements, wherein the one or more vibration frequencies are associated with vibrations caused by the rotor spool up;
attenuate the inertial measurements at the one or more vibration frequencies; and
use the attenuated inertial measurements to align a navigation solution to an at least one reference axis, and establish an orientation with respect to a reference axis for a local level frame of the inertial reference system.

18. The system of claim 17, when identifying the one or more vibration frequencies, instructions further direct the processing system to:
transform a portion of the inertial measurements into the transform domain; and
identify frequencies in the transform domain associated with the vibrations caused by the rotor spool up.

* * * * *